(12) United States Patent
Daloze

(10) Patent No.: US 11,023,234 B2
(45) Date of Patent: Jun. 1, 2021

(54) METHOD AND SYSTEM FOR RESTRUCTURING OF COLLECTIONS FOR SYNCHRONIZATION

(71) Applicant: Oracle International Corporation, Redwood Shores, CA (US)

(72) Inventor: Benoit Daloze, Linz (AT)

(73) Assignee: Oracle International Corporation, Redwood Shores, CA (US)

( * ) Notice: Subject to any disclaimer, the term of this patent is extended or adjusted under 35 U.S.C. 154(b) by 335 days.

(21) Appl. No.: 15/952,213

(22) Filed: Apr. 12, 2018

(65) Prior Publication Data

US 2018/0300132 A1 Oct. 18, 2018

Related U.S. Application Data

(60) Provisional application No. 62/484,745, filed on Apr. 12, 2017.

(51) Int. Cl.
*G06F 9/30* (2018.01)
*G06F 9/38* (2018.01)
*G06F 9/52* (2006.01)

(52) U.S. Cl.
CPC ........ *G06F 9/3009* (2013.01); *G06F 9/30021* (2013.01); *G06F 9/30145* (2013.01); *G06F 9/3885* (2013.01); *G06F 9/52* (2013.01)

(58) Field of Classification Search
None
See application file for complete search history.

(56) References Cited

U.S. PATENT DOCUMENTS

2007/0150509 A1* 6/2007 Lev .................. G06F 9/466

OTHER PUBLICATIONS

Daloze, B. et al., "Techniques and Applications for Guest-Language Safepoints", ICOOOLPS '15, Proceedings of the 10th Workshop on Implementation, Compilation, Optimization of Object-Oriented Languages, Programs and Systems, Article No. 8, Prague, Czech Republic, Jul. 4-10, 2015 (10 pages).
Daloze, B. et al., "Efficient and Thread-Safe Objects for Dynamically-Typed Languages", OOPSLA '16, Proceedings of the 2016 ACM SIGPLAN International Conference on Object-Oriented Programming, Systems, Languages, and Applications, Amsterdam, Netherlands, Nov. 2-4, 2016, pp. 642-659 (18 pages).
Cohen, N. et al., "Layout Lock: A Scalable Locking Paradigm for Concurrent Data Layout Modifications", PPoPP 17, Proceedings of the 22nd ACM SIGPLAN Symposium on Principles and Practice of Parallel Programming, Austin, Texas, USA, Feb. 4-8, 2017, pp. 17-29 (13 pages).

(Continued)

*Primary Examiner* — Corey S Faherty
(74) *Attorney, Agent, or Firm* — Ferguson Braswell Fraser Kubasta PC

(57) ABSTRACT

A method includes implementing a collection for a single thread and a sequential data structure. The single thread includes functionality to execute on a parallel processor. The method further includes detecting whether the collection is shared by multiple threads by tracking reachability of the collection, and modifying the data representation and the implementation of the shared collection for synchronization of the multiple threads. The method may also include testing whether the multiple threads are synchronized on the shared collection.

20 Claims, 7 Drawing Sheets

(56) References Cited

OTHER PUBLICATIONS

Bolz, C. F. et al., "Storage Strategies for Collections in Dynamically Typed Languages", OOPSLA '13, Proceedings of the 2013 ACM SIGPLAN International Conference on Object Oriented Programming, Systems, Languages and Applications, Indianapolis, Indiana, USA, Oct. 29-31, 2013, pp. 167-182 (16 pages).

* cited by examiner

METHOD AND SYSTEM FOR RESTRUCTURING OF COLLECTIONS FOR SYNCHRONIZATION

CROSS-REFERENCE TO RELATED APPLICATION

This application claims benefit under 35 U.S.C. § 119(e) to U.S. Provisional Patent Application Ser. No. 62/484,745, filed on Apr. 12, 2017, and entitled "RESTRUCTURING OF COLLECTIONS FOR SYNCHRONIZATION" with the inventor listed as Benoit Daloze and the Applicant listed as ORACLE INTERNATIONAL CORPORATION. U.S. Provisional Patent Application Ser. No. 62/484,745 is incorporated herein by reference in its entirety.

This application is related to U.S. patent application Ser. No. 15/279,564, filed on Sep. 29, 2016, and entitled "EFFICIENT AND THREAD-SAFE OBJECTS FOR DYNAMICALLY-TYPED LANGUAGES" with the inventor listed as Benoit Daloze and the Applicant listed as ORACLE INTERNATIONAL CORPORATION. This application is also related to U.S. Pat. No. 9,880,931, issued on Jan. 30, 2018, and entitled "SAFEPOINTS FOR GUEST LANGUAGES ON A VIRTUAL MACHINE" with the inventors listed as Christ Seaton and Benoit Daloze and the Applicant listed as ORACLE INTERNATIONAL CORPORATION.

BACKGROUND

Synchronizing access to collections used by multiple threads is a complex topic. Without synchronization, race conditions and various errors are possible. For users of collections to encode explicitly whether a thread-safe collection should be used or to use a collection with only a single thread is cumbersome and error prone.

Most current synchronization approaches use synchronization (i.e., thread-safe) by default, even when a collection is used only by a single thread. Using a synchronized collection incurs overhead and requires modifications to the data structure of the collection, which is a costly choice in terms of performance. Implementing the collections in an efficiently scalable, thread-safe, and semantically-compatible manner is challenging.

SUMMARY

In general, in one aspect, one or more embodiments relate to a method including implementing a collection for a single thread and a sequential data structure. The single thread includes functionality to execute on a parallel processor. The method further includes detecting whether the collection is shared by a plurality of threads by tracking reachability of the collection, and modifying the data representation and the implementation of the shared collection for synchronization of the plurality of threads. The method also includes testing whether the plurality of threads are synchronized on the shared collection.

In general, in one aspect, one or more embodiments relate to a system including a parallel processor comprising core processors, a thread interface with functionality to execute multiple threads on the parallel processor, a computer program stored in memory, a multi-thread detection engine, and a multi-thread synchronization engine. The computer program further executes on a computer processor, and includes functionalities to operate collections accessible by a single thread or multiple threads, and implement a collection for the single thread and a sequential data structure. The single thread includes functionality to execute on the parallel processor. The multi-thread detection engine further executes on the computer processor, accesses the thread interface and the computer program, and includes functionality to detect whether the collection is shared by a plurality of threads by tracking reachability of the collection. The multi-thread synchronization engine further executes on the computer processor, accesses the thread interface and the computer program, and includes functionalities to modify the data representation and the implementation of the shared collection for synchronization of the plurality of threads, and test whether the plurality of threads are synchronized on the shared collection.

In general, in one aspect, one or more embodiments relate to a non-transitory computer readable medium including instructions that, when executed by a processor, perform a method including implementing a collection for a single thread and a sequential data structure. The single thread includes functionality to execute on a computer processor. The method further includes detecting whether the collection is shared by a plurality of threads by tracking reachability of the collection, and modifying the data representation and the implementation of the shared collection for synchronization of the plurality of threads. The method also includes testing whether the plurality of threads are synchronized on the shared collection.

Other aspects of the invention will be apparent from the following description and the appended claims.

DETAILED DESCRIPTION

Figure 1:
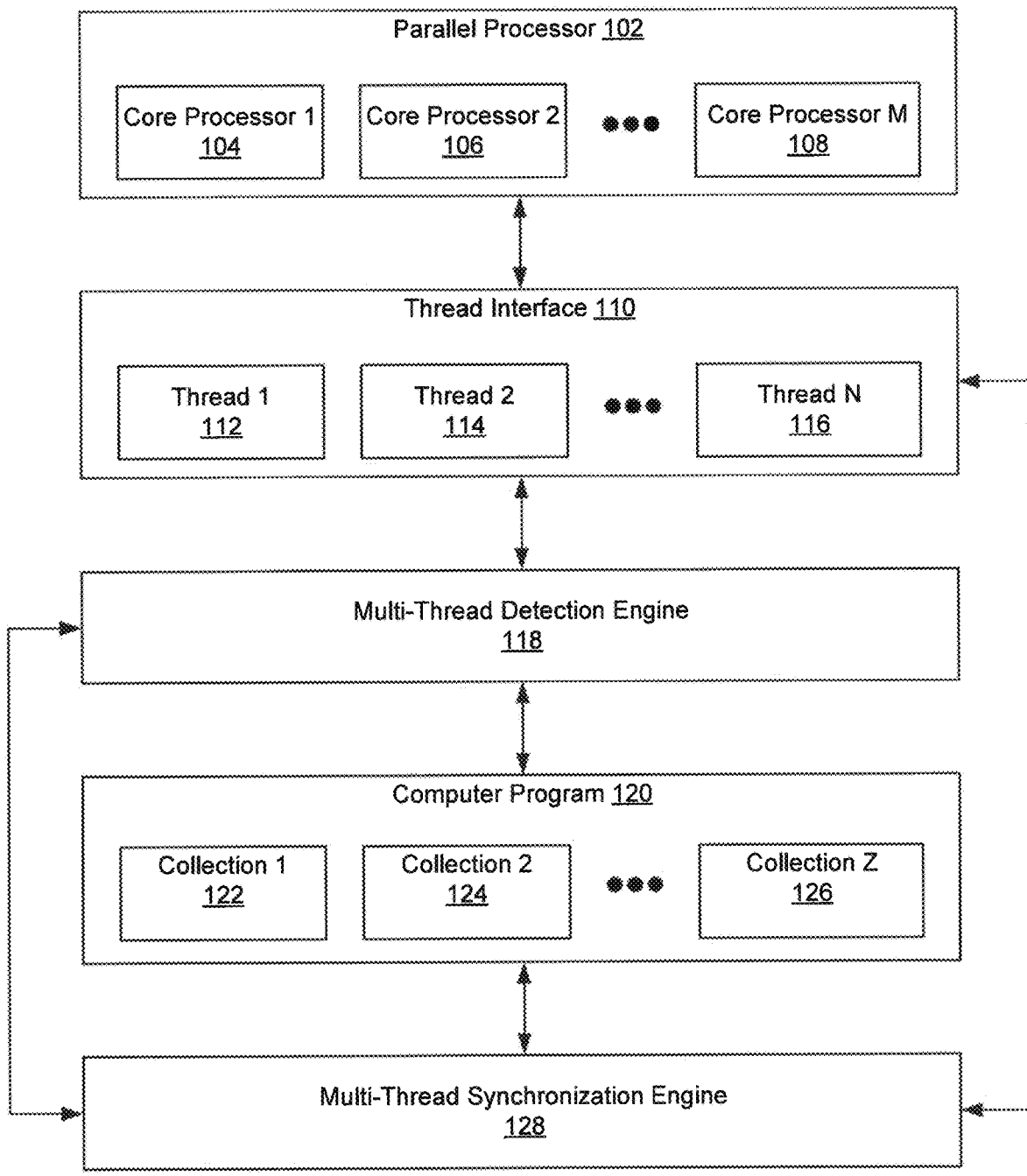
FIG. 1 depicts a schematic system diagram in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to restructuring collections to provide synchronization when the collections become accessible by multiple threads. With the disclosed technology, no overhead exists on collections not shared with other threads, as the restructuring is not applied until the collections first become accessible by multiple threads. In other words, one or more embodiments are directed to implementing a collection for single thread without synchronization and a sequential data structure, and then detecting whether the collection is shared by the multiple threads by tracking reachability of the collection. For example, in one or more embodiments, a sharing status of the collection is maintained by marking the status as shared when the collection becomes shared by multiple threads; likewise, all the elements of the shared collection and all objects reachable from the shared collection are marked as shared by multiple threads.

One or more embodiments also address modifying the data representation and the implementation of the shared collection for synchronization with the multiple threads, and synchronizing the multiple threads on the shared collection. Further, one or more embodiments also address testing whether the multiple threads are synchronized on the shared collection.

In one or more embodiments, a thread is a component of a process where a computer executes a sequence of instructions. Different threads communicate by sharing variables. The threads may access each other's results through shared and global memory. As a result, the threads are able to work together for a computation, but a problem arises when a thread reads a result before another thread writes the result. Therefore, the threads need to synchronize with each other to avoid this situation. The need for synchronization is a fundamental problem of parallel computing.

In one or more embodiments, write barriers may be added to operations that could store the collection somewhere where the collection would be visible to multiple threads, such as to global variables, or to another collection or object that is already shared. The write barrier marks the collection as being synchronized, and may transform the data structure used to represent the collection, such as adding space for locks.

In one or more embodiments, each thread cooperates by acquiring the lock before accessing the corresponding data. Therefore, data is protected with locks. Once a lock is released, the next thread gets a turn. Operations that access the collection now observe that the collection is marked as synchronized, and use synchronized access operations and the new synchronized data structure.

Without synchronization, if a collection is used by multiple threads, race conditions and various errors may occur. Race conditions are caused by unintended sharing of data. For instance, adding an element to the collection concurrently might result in an error. To control race conditions, synchronization needs to be used to protect data conflicts. One solution is to use some form of locks, which can guarantee exclusive access to the collection to perform some operation. These locks add overhead.

Synchronization approaches using a synchronized (i.e. thread-safe) collection incurs some overhead and requires some modification to the structure of the collection, even when the collection is used by a single thread. Accordingly, using thread-safe by default is a costly choice in terms of performance. Most users of collections, therefore, are required to encode explicitly whether to use a thread-safe collection or whether to use thread-safe synchronization only by a single thread. This encoding is cumbersome and prone to error. Moreover, concurrency issues might reveal only after a long time of execution, making any multi-threaded program at risk of encountering an issue at an unpredictable time.

Research on thread safety for collections is not new. However, designing efficient synchronization schemes to achieve thread safety for collections requires many tradeoffs. In the context of dynamic language implementations, efficient synchronization of collections has not received the same attention.

Dynamic programming languages such as JavaScript, Python, and Ruby offer a few and versatile built-in collections, which combine features of lists, arrays, stacks, maps and other specialized collections into uniform abstractions. These abstractions define strict semantic requirements, such as maintaining an insertion order, in order to support multiple consistent views. As previously mentioned, implementing such built-in collections in an efficiently scalable, thread-safe, and fully semantically-compatible manner is challenging. When considering which type of collection to use in a multithreaded context, the decision becomes even more complex. In addition to considering how data is added, removed, or modified, one also needs to consider how multiple threads interact with a collection.

So far, most dynamic languages do not support fully parallel execution and safe concurrent modification of collections. When dynamic languages do provide support, overhead is required for ensuring thread safety, which degrades single-threaded performance. Dynamic languages are very restrictive when it comes to concurrency. For example, JavaScript prevents sharing of arrays and dictionaries between threads. While Ruby and Python support sharing, the standard implementations (MRI and CPython) rely on global interpreter locks (GIL) preventing parallel access. Jython, Python on the Java Virtual Machine (JVM), does not use a GIL but synchronizes every object and collection access, which prevents scalability. PyPy-STM emulates the GIL semantics while allowing scaling but incurs a significant overhead on single-threaded performance. JRuby aims for scalability but does not provide any thread safety for built-in collections. Instead, developers are expected to synchronize all accesses to, for example, Array objects (described below), even for operations that are presumably safe from the language perspective.

The primary reason for the lack of thread-safe and efficient implementations of built-in collections is the all-in-one approach for dynamic languages. Maintaining the sequential-like consistency of multiple views of same data structure requires complex synchronization.

In one or more embodiments of the disclosure, an approach is described that has zero overhead on collections when used by a single thread. When a collection becomes accessible by multiple threads, the technique switches to a thread-safe and a scalable synchronization strategy automatically. Therefore, the approach allows maintaining the expressiveness of dynamic languages, and also for multi-threaded code. The disclosed approach neither requires developers to decide upfront which specific kind of collection to use, nor does the approach imply over-synchronization, which would inhibit scalability and multithreaded performance.

FIG. 1 depicts a schematic diagram showing a system for restructuring collections for synchronization, in accordance with one or more embodiments. As depicted, a parallel processor (102) includes multiple core processors, e.g., core processor 1 (104), core processor 2 (106), and core processor M (108), etc. The parallel processor (102) may be connected to a thread interface (110) that includes multiple threads, e.g., thread 1 (112), thread 2 (114), and thread N (116), etc. One or more of the multiple threads (e.g., thread 1 (112), thread 2 (114), and thread N (116), etc.) may execute on the parallel processor (102) or more specifically, on one or more of the core processors (e.g., core processor 1 (104), core processor 2 (106), and core processor M (108), etc.) of the parallel processor (102) via the thread interface (110).

In one or more embodiments, the multi-thread detection engine (118) is operatively connected to the thread interface (110), a computer program (120), and a multi-thread synchronization engine (128).

In one or more embodiments, the computer program (120) contains multiple collections, e.g., collection 1, collection 2, and collection Z, etc. In one or more embodiments, the multi-thread synchronization engine (128) is operatively connected to the thread interface (110), the multi-thread detection engine (118), and the computer program (120).

In one or more embodiments, each collection (e.g., collection 1 (122), collection 2 (124), collection Z (126), etc.) is a data structure (e.g., array, linked list, hash table, queue, stack, etc.). The collection may be implemented in hardware (i.e., circuitry), software, or any combination thereof. When the collection is initially implemented, the collection is implemented for use by a single thread. Accordingly, no multithread synchronization issues exist and the collection does not require a structure suitable for access by multiple threads.

The multi-thread detection engine (118) may be implemented in hardware (i.e., circuitry), software, or any combination thereof. The multi-thread detection engine (118) determines when the collection becomes accessible to multiple threads (e.g., thread 1 (112), thread 2 (114), and thread N (116)). In other words, the multi-thread detection engine (118) determines when the collection becomes a shared collection (i.e., shared by multiple threads). This may include determining whether the collection is accessible through a write to a shared variable.

In one or more embodiments, the multi-thread synchronization engine (128) includes functionality to modify a data representation and an implementation of a shared collection (e.g., collection 1 (122), collection 2 (124), collection Z (126), etc.) for synchronization with the multiple threads (e.g., thread 1 (112), thread 2 (114), and thread N (116)), and test whether the multiple threads are synchronized on the shared collection.

While FIG. 1 shows a configuration of components, other configurations may be used without departing from the scope of the invention. For example, various components may be combined to create a single component. As another example, the functionality performed by a single component may be performed by two or more components. In particular, the multi-thread detection engine (118) and the multi-thread synchronization engine (128) are shown as two separate engines, in one or more embodiments, the multi-thread detection engine (118) and the multi-thread synchronization engine (128) are a single engine. Although in FIG. 1 the multi-thread detection engine (118) and the multi-thread synchronization engine (128) are shown as being external to the collection, in one or more embodiments, the multi-thread detection engine (118) and the multi-thread synchronization engine (128) are internal to the collection.

Figure 2:
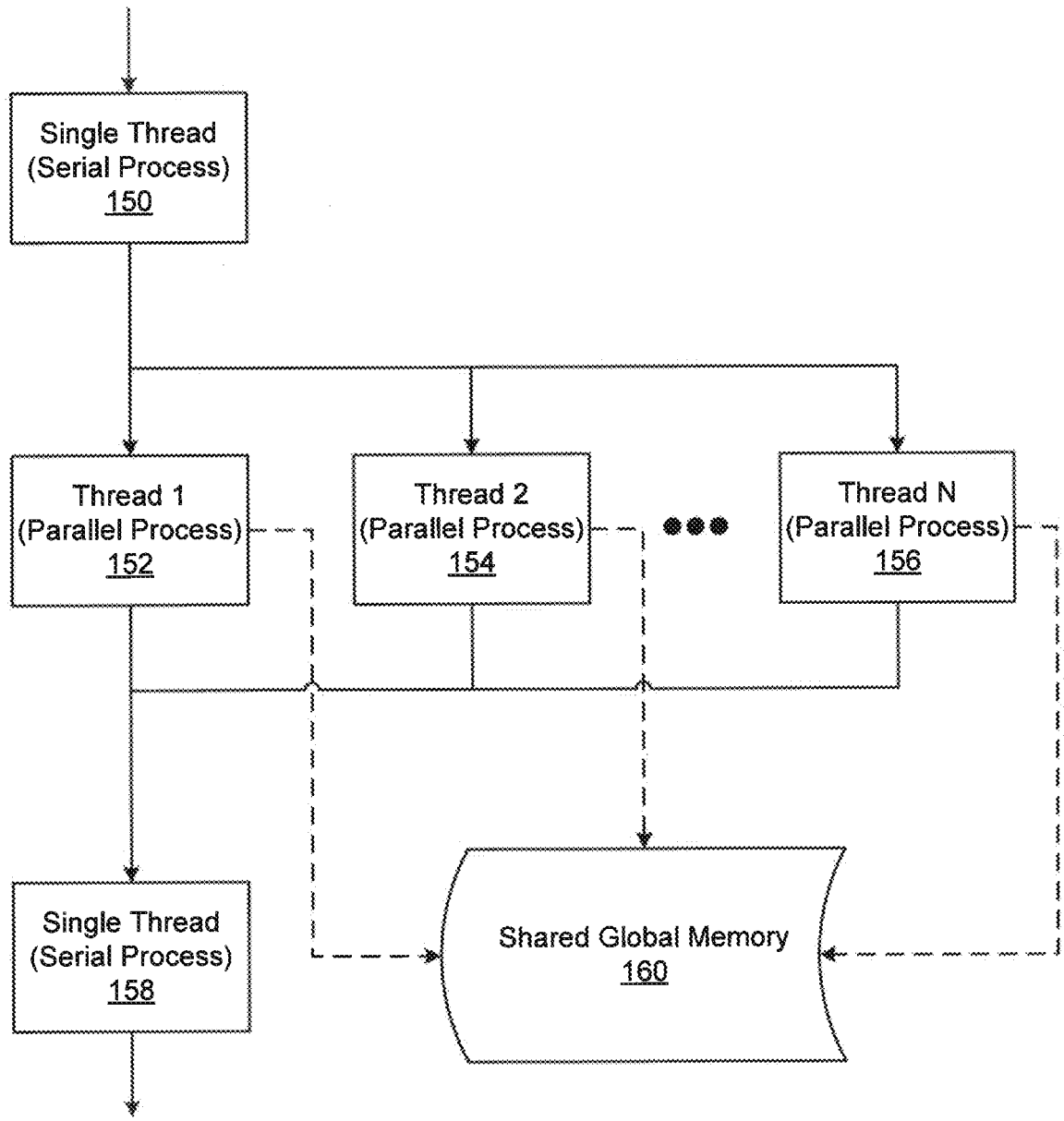
FIG. 2 depicts a multi-thread model with one or more embodiments.

FIG. 2 depicts an example of multi-thread model, in accordance with one or more embodiments. This multi-thread model shows a method of parallelizing whereby a single thread (i.e. a series of instructions executed consecutively) forks multiple number of threads which execute blocks of code in parallel. The multiple threads may run concurrently, with the runtime environment allocating one or more threads to one or more different processors.

At first, a single thread (150) executes serial code prior to a parallel construct. Then, the single thread (150) spawns a team of threads, e.g., thread 1 (152), thread 2 (154), and thread N (156), etc. Parallelism is added incrementally until performance goals are met, i.e. the sequential program evolves into a parallel program.

The multiple threads, e.g., thread 1 (152), thread 2 (154), and thread N (156), etc., executing on different core processors, may have access to shared variables stored at a shared global memory (160), and may modify the shared data set. After execution of the parallelized code, the multiple threads join back to a single thread (158) which continues to execute the next serial code with the modified data set.

Figure 3:
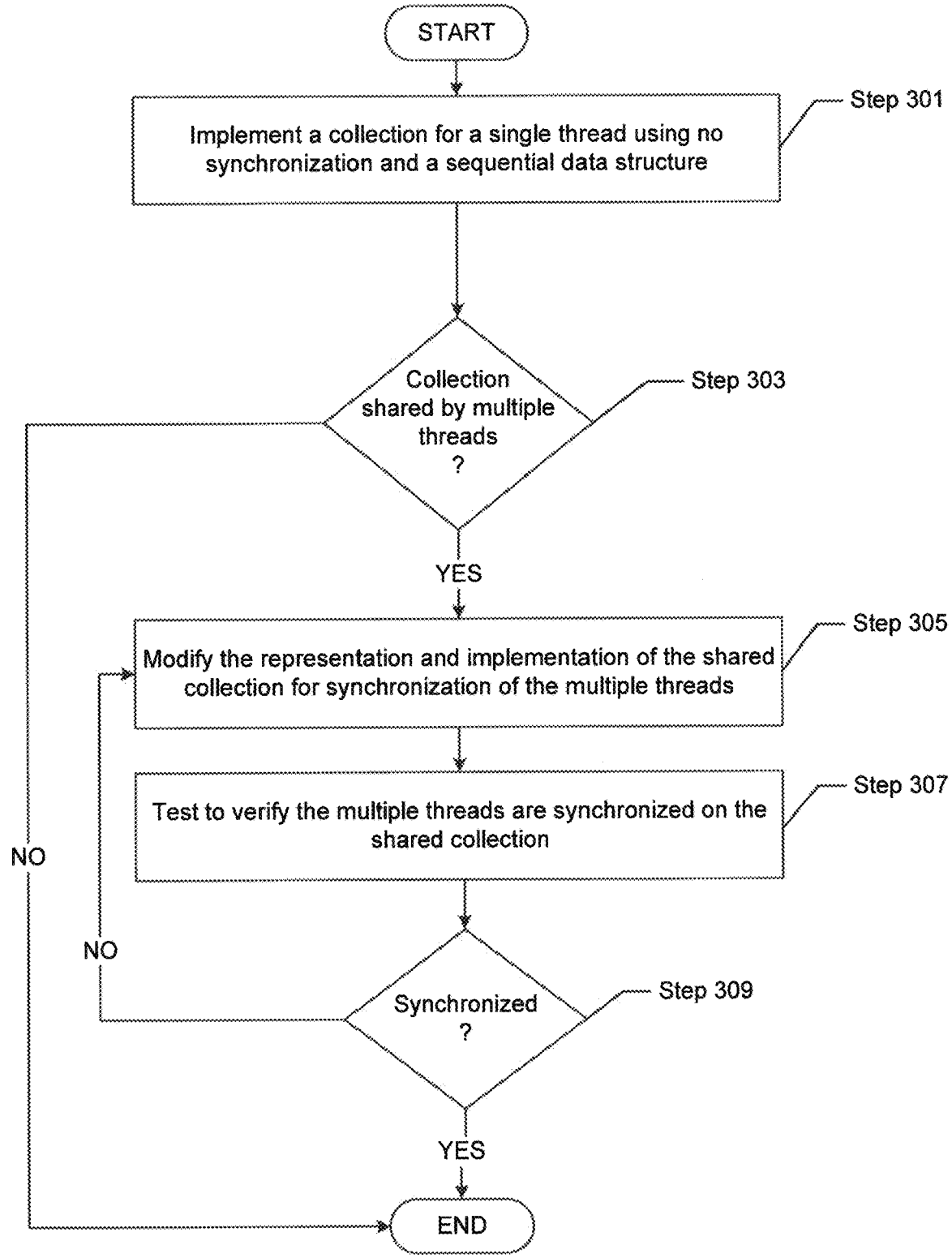
FIG. 3 depicts a flowchart diagram in accordance with one or more embodiments.

FIG. 3 depicts a flowchart diagram of a process for restructuring collections for synchronization, in accordance with one or more embodiments. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

At Step 301, a collection is implemented for a single thread without synchronization and a sequential data structure. Operations that access the collection use unsynchronized access operations and the sequential data structure. Since synchronization is complex and expensive, the disclosed method minimizes the need for synchronization.

At Step 303, a detection is made whether the collection is shared (e.g., by checking the sharing status) by a plurality of threads by tracking reachability of the collection. If the collection is not shared by multiple threads (e.g., by checking the sharing status), then the process ends. Otherwise, the process continues to Step 305 (described below).

Parallel algorithms aiming for good performance typically use local data structures for some part of the work, and only work with shared data structures when necessary. Based on this observation, the idea of tracking reachability of objects is adopted and applied to track whether collections are shared between multiple threads or only accessible by a single thread. Parallel algorithms thereby take advantage of local collections without incurring any synchronization overhead.

A thread-safe object storage model for dynamic languages enables efficient synchronization of accesses to objects that support the addition and removal of fields at run time and for which the storage is specialized for primitive values. To achieve efficiency, objects are tracked to determine whether they are shared between threads or local to a single thread. The tracking is based on the reachability of objects from global roots, such as global variables and constants accessible to all threads. Reachability is updated dynamically by placing a write barrier on shared objects. When a local object is written to a shared object, the object automatically becomes reachable, and therefore is marked as shared, as well as all local objects that can be reached from it. This marking is done by changing the object's shape—part of the object's meta-data describing its fields—to an identical shape but with an extra shared flag set to true. The marking allows existing shape checks, used e.g. for method calls and object field accesses, to also know whether an object is shared (or not) at no additional cost. Using this approach, local objects do not need any synchronization, which means no overhead exists until an object is shared. Shared objects require synchronization on all write operations, and where fields may be added and removed from the object, to avoid lost updates.

In most dynamic languages, collections are also objects. This means the collections can track whether they are shared (or not) in the same manner as objects do, in their shape. When a collection becomes shared, all its elements are marked as shared, as well as all local objects that may be reached from these elements. Using storage strategies, e.g., an array of integers, is beneficial in such a case, since the array cannot contain any objects that require sharing, thereby minimizing sharing overhead. Shared collections also need to use a write barrier when elements are added to them, as these elements become reachable through the shared collection.

At Step 305, if the collection is shared by multiple threads, the data representation and the implementation of the shared collection for synchronization with multiple threads are modified. In other words, modifying the data representation and the implementation initiates only when the collection is shared by multiple threads. Collections are able to take advantage of the knowledge of being local to a thread or shared. Specifically, the representation and implementation may be modified when the collection becomes shared to optimize for concurrent operations. Modifying the representation and implementation is safe and does not need synchronization, because this transformation is done while the collection is still local to a thread, before sharing the collection with other threads.

This modification of representation and implementation allows local collections to keep an unsynchronized and optimal implementation with no overhead, while allowing a different implementation for shared collections. Therefore, tracking sharing in such a way enables zero overhead on local collections, and automatically synchronize collections when the collection(s) becomes shared between threads.

The internal representation of a collection may be modified arbitrarily when the collection becomes shared, to be optimal for concurrent operations. The modification of the internal representation is safe and needs no synchronization because this transformation is performed while the collection is still local to a thread, before installing the collection into a shared variable which publishes the collection to other threads.

At Step 307, a test is executed to verify that the multiple threads are synchronized on the shared collection. Testing whether a collection is synchronized (or not) is performed using a guard on each access, a simple cheap machine-word comparison. As all method dispatches in dynamic languages such as Ruby and JavaScript already need such a guard to check whether the correct method is being used, combine this new guard with that guard, so that the word compared against is a tuple. Specifically, the tuple is made up of two elements—(synchronized-or-not, class).

At Step 309, an evaluation whether the multiple threads are synchronized. If so, the process ends; otherwise, the process returns to Step 305 for further modification and then testing to verify the multiple threads are synchronized.

The following examples are for explanatory purposes only and not intended to limit the scope of the invention.

Figure 4:
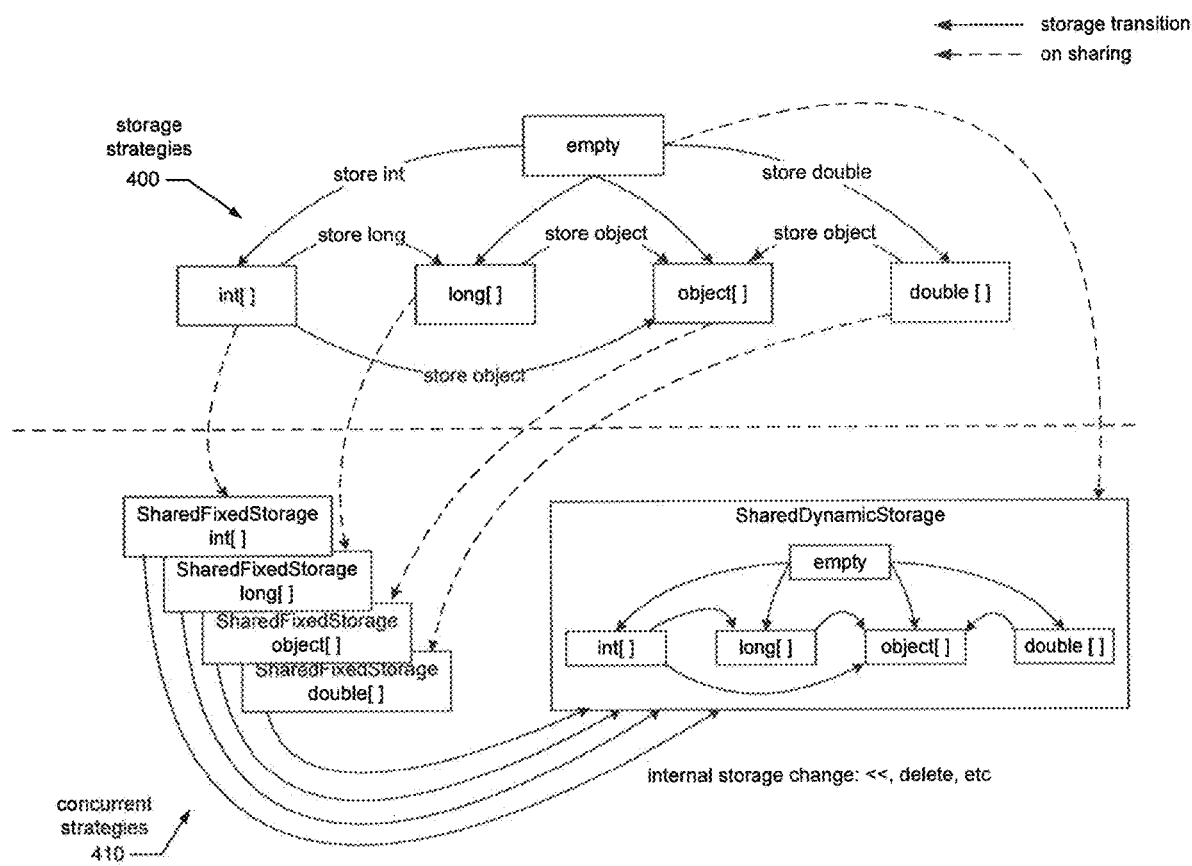
FIG. 4, FIG. 5, and FIG. 6 depict graph views in accordance with one or more embodiments.

FIG. 4 are graph views that depict design and implementation for array-like collections in TruffleRuby, a high performance Ruby implementation, in accordance with one or more embodiments. While this implementation uses Ruby, one skilled in the art will appreciate that any dynamic programming language may be used and have similar constructs, similar to the array-like collections in Ruby (e.g. Python uses a list and JavaScript uses an Array).

An Array object is common to many dynamic programming languages. An Array object that is a vector, a stack, a list and a queue needs to support dynamic resizing (from both ends, which may involve reallocation), insertion, and deletion at any index. A major challenge is that arrays in dynamic languages are not a simple disciplined data structure. An Array in Ruby may be used as a fixed-size array (e.g., a collection indexed by integers from 0 to size−1), but the Array may also be used as a stack, a queue, or a set. Overall, the Array in Ruby has more than 100 methods, including operations that insert and remove elements from the middle or replace the entire contents at once, which may even happen concurrently while iterating. As a result, synchronizing arrays in dynamic languages for correctness and parallelism is challenging. Using a lock free implementation is nearly impossible due to so many complex operations. On the contrary, since Array is used as a versatile unifying abstraction supporting a wide range of use cases, the synchronization mechanism should be as versatile to adapt to the different supported use cases.

In one or more embodiments, FIG. 4 depicts the combination of concurrent strategies with a storage strategy. In FIG. 4, the plain arrows represent storage transitions and the dashed arrows represent transitions when sharing an array. SharedDynamicStorage adapts its storage strategy dynamically, while the storage strategy is fixed for SharedFixedStorage.

In one or more embodiments, the top half of FIG. 4 depicts the storage strategies (400) in the implementation of Array. For an optimal data representation and as foundation for concurrent strategies, TruffleRuby uses five storage strategies in the implementation of Array. An empty strategy is used for empty arrays. If all elements are integers in the value range of int, an int[ ] storage is used. If larger integers are required, a long[ ] storage is used. Arrays of floating point numbers use a double[ ] storage. For objects or non-homogenous arrays, an Object[ ] storage is used. To minimize the transitions between strategies, adding an element to the array that cannot be stored with the current strategy causes a migration to a more general strategy, e.g., Object[ ]. The design of these strategies is motivated by common ways to create an Array. Many arrays start as an empty array literal [ ] for which the empty strategy is used. As elements are added to the array, the Array migrates to the most appropriate strategy. Another common constructor is Array.new(size, default_value) which builds an array with the given size with all its elements set to the default_value. In such a case, the storage strategy of the array will be chosen based on the type of the default_value.

In one or more embodiments, the bottom half of FIG. 4 depicts the concurrent strategies (410) in the implementation of Array. When an array is shared, operations on the array need to use some form of synchronization. Concurrency issues need to be considered only when an array becomes accessible by multiple threads. Thus, prior to the array becoming shared, the array strategy needs to be changed to a concurrent strategy. Operations on an array with a concurrent strategy ensure that all accesses use appropriate synchronization. Optimizing the data representation is still important. Therefore, concurrent strategies add a new dimension to the existing storage strategies, i.e. concurrency, and contain a nested storage strategy.

Two predominant usage patterns are anticipated for arrays used concurrently in dynamic languages. On one hand, arrays are expected to be used in classic parallel algorithms as fixedsized abstractions, for instance for fork/join computations. The fixedsized abstractions are supported by the previously mentioned Array constructor that initializes the array to a given size. On the other hand, arrays are expected to be used in more dynamic ways, for instance for communicating elements between threads in a consumer/producer style. Two concurrent strategies are designed to optimize for these usage patterns, i.e. SharedFixedStorage strategy and SharedDynamicStorage strategy.

The first concurrent strategy is SharedFixedStorage, which assumes that the array storage strategy and the array size are fixed and do not need to change. This concurrent strategy expects that by the time the array is shared, the array already reached the appropriate size. Reaching the appropriate size is often the case when the array is created with a given size (Array.new(size)) or, for instance, based on an existing array with the map method. Thus, this strategy expects that elements are not added or removed from the array as that would change the size, and that elements updated in the array will be of the same type, e.g., int for a int[ ] storage, so that the storage strategy does not need to change. This storage strategy is designed to have zero overhead over non-shared arrays as the arrays do not need any synchronization. However, if this speculation turns out to be wrong, e.g., when an element of incompatible type is stored in the array or the size of the array needs to change, the array migrates to the SharedDynamicStorage strategy, which handles storage strategy changes and all array operations safely, at the expense of some synchronization overhead. But since the array is already shared, the migration must be done carefully such that all threads observe this strategy change atomically.

The second concurrent array strategy is SharedDynamicStorage. The SharedDynamicStorage strategy uses a lock to synchronize accesses to the array. In principle, a wide range of different locks may be used by this strategy. When sharing an array between threads, a simple heuristic is used to decide which concurrent strategy is chosen. The SharedFixedStorage strategy is chosen for all non-empty arrays and the SharedDynamicStorage strategy is chosen for empty arrays. Since an empty array cannot be accessed in bounds for read or write accesses, it is very likely that its storage will change, e.g., when the first element is added to the array.

The transitions to concurrent strategies are depicted in FIG. 4 with dashed arrows. FIG. 4 shows that SharedDynamicStorage adapts its storage strategy dynamically, while the storage strategy is fixed for SharedFixedStorage. The SharedFixedStorage strategy speculates that the array storage does not change and its size remains constant. With these assumptions, the strategy enables unsynchronized read and write accesses. If these assumptions are violated, an Array needs to migrate to a SharedDynamicStorage strategy, which can handle all array operations safely.

Since the array is already shared, the strategy is changed so that all threads observe the change atomically and use the new strategy for all further operations on this array. This change to the new strategy is achieved by using guest-language safepoints. Guest-language safepoints are a mechanism to suspend all threads of a Virtual Machine (VM) that execute guest-language code to synchronize and coordinate between them. The suspension of all threads of a VM is achieved by ensuring that each thread regularly and in small time intervals either actively or passively checks whether a safepoint was requested. When entering a safepoint, a thread first waits on a barrier until all threads reach the safepoint. Then it performs the safepoint action and waits on a barrier until all threads have finished executing the action. Finally, all threads resume normal execution. As a result all threads have the exact same view of the heap at both barriers and all changes from the safepoint action are visible to all threads.

In TruffleRuby, such guest-language safepoints checks are placed in the Ruby method preludes and in Ruby loop back edges. Built-in operations on Array do however not check safepoints to avoid interference with the concurrent strategies. Instead, safepoints happen either before or after such built-ins. For the implementation of Array built-ins this means that they only need to check once, at the beginning, which strategy an array uses, and the strategy does not change during the built-in execution.

For the second concurrent array strategy, SharedDynamicStorage, any type of lock may be used to synchronize array operations. For example, a read-write lock may be used. All array operations are synchronized with the lock.

The goal of the strategy is to provide thread-safety guarantees for the implementation level. Specifically, neither lost updates, out-of-bounds errors, nor out-of-thin-air values should occur as a result of the implementation strategy used. With the proposed design, and its careful implementation for each array operation, The goal of thread-safety is achieved. The errors are either avoided by using a safepoint when switching from SharedFixedStorage to SharedDynamicStorage, or by synchronizing racing operations on an array via the lock. When the size or storage assumptions fail for an array that uses the SharedFixedStorage strategy, it needs to be migrated to use the SharedDynamicStorage. However, since such an array is shared, i.e., reachable by multiple threads, guest-language safepoints are used. These safepoints require global synchronization and, therefore, stop all threads during the operation. If these safepoints are too frequently, the safepoints could severely reduce a program's scalability and performance.

In parallel programs, two dominant usage patterns for shared arrays exist for which safepoints should be avoided. The first is pre-allocating an array with a given size, reading elements by index, updating elements with values of the same type, and not changing the size of the array. This pre-allocation exercise is a common pattern for many shared-memory concurrency models like map-reduce, fork-join, etc. The usage pattern is the same as using a fixed-size array in statically-typed languages, where the array size does not change and the type of the array is fixed in advance. Applications like image transformations and big data processing commonly use this pattern. In such a case, the SharedFixedStorage strategy is used and should not need to change. The second usage pattern observed in idiomatic Ruby code is one were an empty array is allocated and elements are arbitrarily appended or removed. The SharedDynamicStorage strategy is chosen immediately when an empty array is shared, which avoids safepoints.

Figure 5:
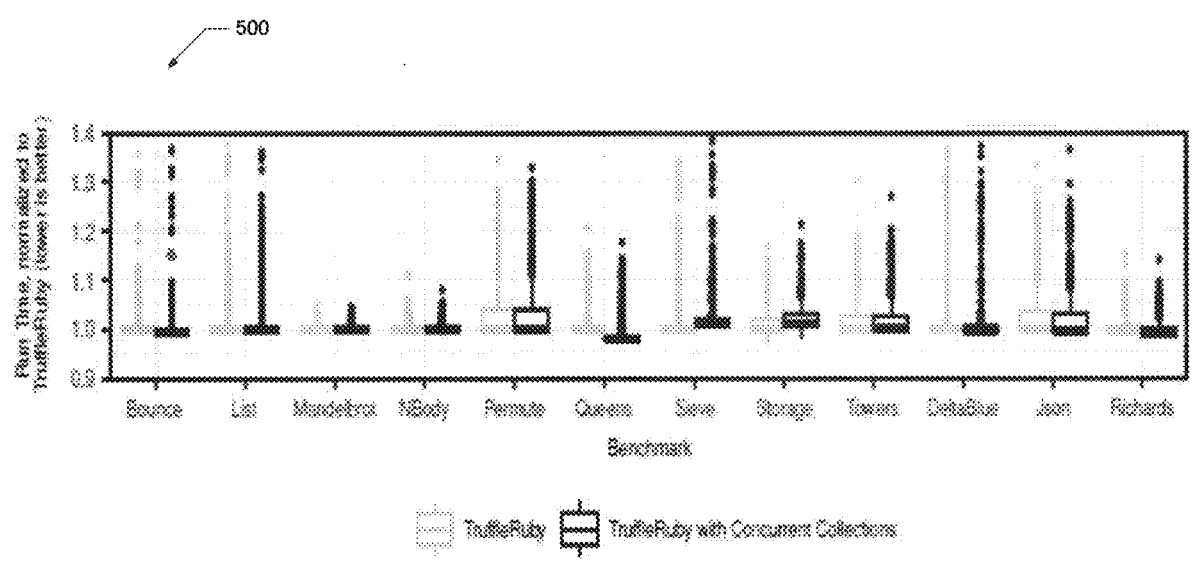

FIG. 5 depicts a graph view showing the evaluation of the performance of concurrent strategies, in accordance with one or more embodiments.

In this example, while any number or type of benchmarks may be used, twelve single-threaded benchmarks of TruffleRuby are used to evaluate the performance of concurrent strategies. These twelve benchmarks are Bounce, List, Mandelbrot, NBody, Permute, Queens, Sieve, Storage, Towers, DeltaBlue, Json, and Richards. The runtime factors on these twelve single-threaded benchmarks of TruffleRuby with concurrent strategies, are compared to those of TruffleRuby without concurrent strategies.

For this example, the concurrent strategies are implemented in TruffleRuby. The benchmarks are executed on a machine with two non-uniform memory access (NUMA) nodes, each with a 22-core Intel® Xeon® CPU E5-2669 v4 with hyperthreads, operating at 2.20 GHz with disabled frequency scaling. The machine has 378 GB RAM, 32 KB L1 cache and 256 KB L2 cache per core, and 55 MB L3 cache per NUMA node. Oracle Linux 6.8 (kernel version 4.1.12-37.5.1.el6uek) is used. The median peak performance is reported based on the 10 last throughput measurements within the same Java Virtual Machine (JVM) instance. The throughput is measured for five seconds for each iteration. Using throughput allows for weak scaling, i.e., the problem size is increased together with the number of threads.

The "AreWe Fast Yet" benchmark suite is used. This suite contains classic benchmarks in different languages, notably Ruby. One thousand iterations of each benchmark is run and the first two hundred iterations of warmup are removed to observe peak performance. The evaluation results (500) are depicted in FIG. 5. The lighter grey color represents TruffleRuby without concurrent strategies, and the darker grey color represents TruffleRuby with concurrent strategies as labelled. The performance difference between the two versions is within measurement errors, which confirms that the performance of sequential code is not affected. This result is expected because these benchmarks do not write to shared state and only use local collections, even though global constants and class state are shared during startup. Therefore, a conclusion can be made that adding concurrent strategies has no impact on the performance of single threaded code.

Figure 6:
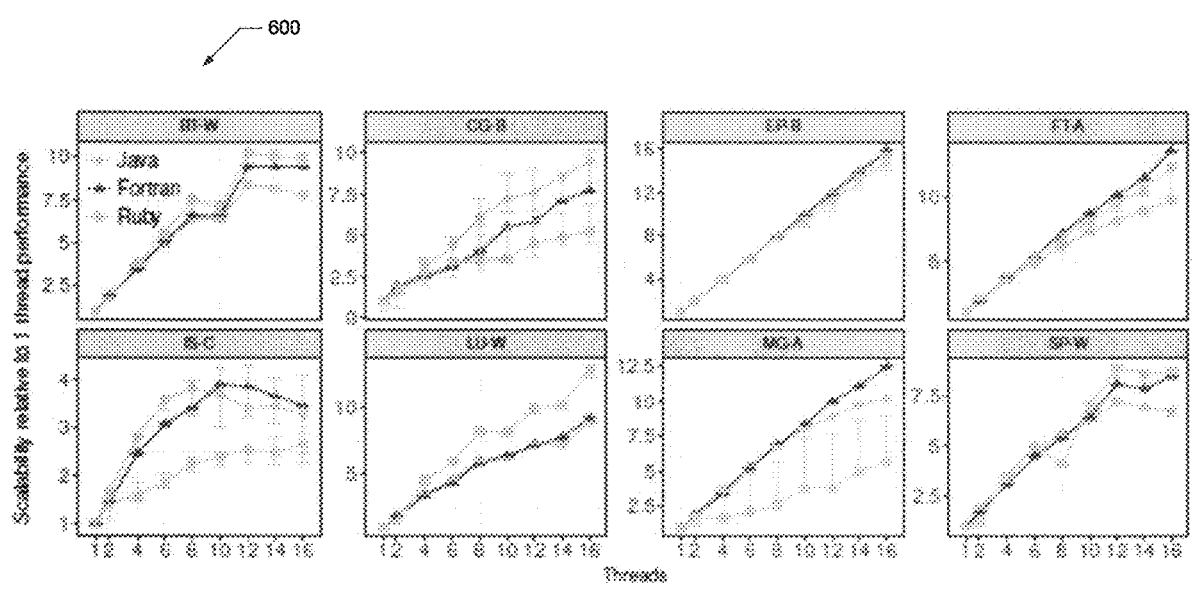

FIG. 6 depicts graph views showing the scalability relative to one thread performance per language on the NASA Advanced Supercomputing (NAS) Division (based at the NASA Ames Research Center) Parallel Benchmarks, in accordance with one or more embodiments.

For the purposes of this example, the NASA Advanced Supercomputing Parallel Benchmarks 3.0 (NPB) is used to evaluate the method of restructuring of collections for synchronization on classic parallel benchmarks. The NPBs are derived from computational fluid dynamics applications and focus on arithmetic operations and array accesses. The Ruby version was automatically translated from Java. The benchmarks did not include warmup, so the benchmarks are modified to run 10 times consecutively in the same process for Java and Ruby and remove the first 2 runs of warmup. The largest benchmark classes are picked such that each benchmark iteration takes, at most, 8 minutes when run with one thread. Note that the Fortran version is much more optimized. For instance, the benchmark parameters are compiled as constants for the Fortran version, while the benchmark parameters are read from object fields for Java and Ruby. Consequently, the focus should be on scalability.

The results (600) depicted in FIG. 6 show that all languages (each labelled in the initial graph) scale similarly on these benchmarks.

The results depicted in FIG. 5 and FIG. 6 show that for parallel workloads, where threads do not interfere with one another, the synchronization overhead of the inventive approach is minimal (less than 2%), while scalability is linear in the number of CPU cores. For cases where collections are used in a more dynamic fashion, performance varies between close to single-threaded performance in high contention scenarios (even as the number of threads me synchronization overhead), and close to linear scalability in low contention scenarios.

In conclusion, the inventive method of restructuring of collections for synchronization provides a safe, efficient, and scalable programming model enabling classic parallel algorithms.

The method of restructuring of collections for synchronization is applicable in any VM capable of instrumenting writes of shared variables, marking collections assigned to these shared variables with a flag, and changing their behavior or representation. For example, implementations of the JVM, such as at least IBM J9, and VMs for other languages such as at least V8 are impacted by the innovative method.

Figure 7A:
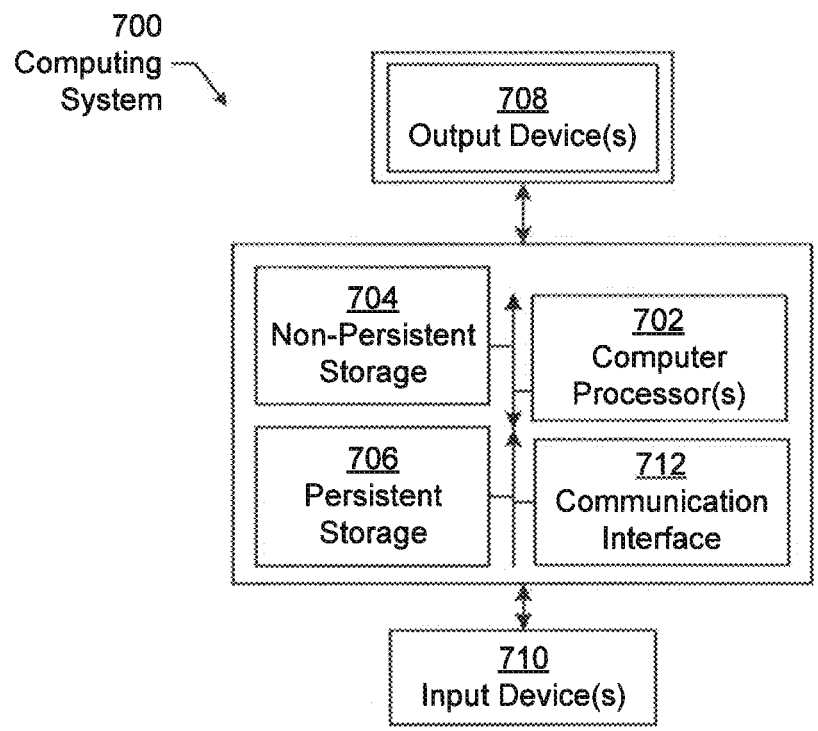
FIG. 7A and FIG. 7B depict diagrams showing a computing system, in accordance with one or more embodiments.

Embodiments of the invention may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 7B:
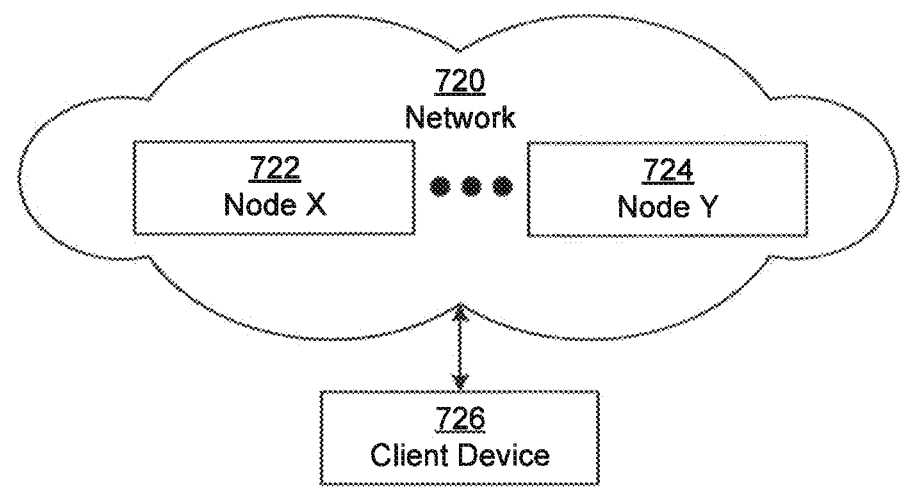

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the invention.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 7A and the nodes and/or client device in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   implementing a collection for a single thread and a sequential data structure, wherein the single thread comprises functionality to execute on a parallel processor;
   detecting that the collection is a shared collection that is shared by a plurality of threads by tracking reachability of the collection;
   modifying a data representation of the shared collection for synchronization of the plurality of threads by changing an original shape of the data representation of the shared collection to a modified shape that allocates storage for a shared flag, wherein the original shape does not have allocated storage for the shared flag; and
   testing whether the plurality of threads are synchronized on the shared collection.

2. The method of claim 1, wherein modifying the data representation initiates only when the collection is shared by the plurality of threads.

3. The method of claim 1, further comprising:
   marking a sharing status of the collection as shared when the collection becomes shared by the plurality of threads; and
   marking all the elements of the shared collection and all objects reachable from the shared collection as shared by the plurality of threads.

4. The method of claim 1, further comprising:
   adding a write barrier to the shared collection to mark the shared collection as being synchronized.

5. The method of claim 1, further comprising:
   updating dynamically the reachability using a write barrier placed on the shared collection.

6. The method of claim 1, wherein modifying the representation of the shared collection for synchronization with the plurality of threads is performed while the collection is local to a thread, before the collection is shared with the plurality of threads.

7. The method of claim 1, wherein testing whether the plurality of threads are synchronized on the shared collection comprises a machine-word comparison using a tuple.

8. A system, comprising:
   a parallel processor comprising a plurality of core processors;
   a thread interface with functionality to execute a plurality of threads on the parallel processor;
   a computer program, stored in memory, executing on a computer processor, and configured to:
     operate a plurality of collections accessible by a single thread or a plurality of threads, wherein the single thread comprises functionality to execute on the parallel processor, and
     implement a collection for the single thread and a sequential data structure;
   a multi-thread detection engine executing on the computer processor, accessing the thread interface and the computer program, and configured to:
     detect that the collection is a shared collection that is shared by a plurality of threads by tracking reachability of the collection; and
   a multi-thread synchronization engine executing on the computer processor, accessing the thread interface and the computer program, and configured to:
     modify a data representation of the shared collection for synchronization of the plurality of threads by changing an original shape of the data representation of the shared collection to a modified shape that allocates storage for a shared flag, wherein the original shape does not have allocated storage for the shared flag, and
     test whether the plurality of threads are synchronized on the shared collection.

9. The system of claim 8, wherein a multi-thread synchronization engine is further configured to modify the data representation by initiating only when the collection is shared by the plurality of threads.

10. The system of claim 8, wherein the multi-thread synchronization engine is further configured to:
    mark a sharing status of the collection as shared when the collection becomes shared by the plurality of threads; and
    mark all the elements of the shared collection and all objects reachable from the shared collection as shared by the plurality of threads.

11. The system of claim 8, wherein the multi-thread synchronization engine is further configured to:
    add a write barrier to the shared collection to mark the shared collection as being synchronized.

12. The system of claim 8, wherein reachability is updated dynamically by a write barrier placed on the shared collection.

13. The system of claim 8, wherein modifying the representation of the shared collection for synchronization with the plurality of threads is performed while the collection is local to a thread, before the collection is shared with the plurality of threads.

14. The system of claim 8, wherein synchronizing the plurality of threads on the shared collection comprises performing thread-safe and scalable operations on the shared collection.

15. A non-transitory computer readable medium comprising instructions which, when executed by a computer processor, perform:
    implementing a collection for a single thread and a sequential data structure, wherein the single thread comprises functionality to execute on a computer processor;
    detecting that the collection is a shared collection that is shared by a plurality of threads by tracking reachability of the collection;
    modifying a data representation of the shared collection for synchronization of the plurality of threads by changing an original shape of the data representation of the shared collection to a modified shape that allocates storage for a shared flag, wherein the original shape does not have allocated storage for the shared flag; and testing whether the plurality of threads are synchronized on the shared collection.

16. The non-transitory computer readable medium of claim 15, wherein modifying the data representation initiates only when the collection is shared by the plurality of threads.

17. The non-transitory computer readable medium of claim 15, further comprising instructions which, when executed by the computer processor, perform:

marking a sharing status of the collection as shared when the collection becomes shared by the plurality of threads; and marking all the elements of the shared collection and all objects reachable from the shared collection as shared by the plurality of threads.

18. The non-transitory computer readable medium of claim 15, further comprising instructions which, when executed by the computer processor, perform:

adding a write barrier to the shared collection to mark the shared collection as being synchronized.

19. The non-transitory computer readable medium of claim 15, wherein testing whether the plurality of threads are synchronized on the shared collection comprises a machine-word comparison using a tuple.

20. The method of claim 1, wherein the data representation of the shared collection is further modified by adding, to the data representation of the shared collection, space for a lock.

* * * * *